United States Patent
Reed et al.

(10) Patent No.: US 7,284,648 B2
(45) Date of Patent: Oct. 23, 2007

(54) NON-SEALED PARK ACTUATOR GUIDE FOR HYBRID TRANSMISSION AND METHOD

(75) Inventors: William S. Reed, Greenfield, IN (US); James A. Raszkowski, Indianapolis, IN (US); Joel E. Mowatt, Zionsville, IN (US); Bert D. Love, Brownsburg, IN (US); Rick K. Daugherty, Clayton, IN (US)

(73) Assignee: General Motors Corporation, Detroit, MI (US)

( * ) Notice: Subject to any disclaimer, the term of this patent is extended or adjusted under 35 U.S.C. 154(b) by 163 days.

(21) Appl. No.: 11/049,373

(22) Filed: Feb. 2, 2005

(65) Prior Publication Data

US 2005/0205384 A1    Sep. 22, 2005

Related U.S. Application Data

(60) Provisional application No. 60/555,141, filed on Mar. 22, 2004.

(51) Int. Cl.
*B60W 10/10* (2006.01)
*B60W 10/18* (2006.01)

(52) U.S. Cl. .................... 192/219.5; 29/428

(58) Field of Classification Search ............ 192/219.5
See application file for complete search history.

(56) References Cited

U.S. PATENT DOCUMENTS

| | | | |
|---|---|---|---|
| 4,585,103 A * | 4/1986 | Kuwayama et al. ..... | 192/219.5 |
| 4,606,242 A * | 8/1986 | Hasegawa et al. ........ | 74/606 R |
| 4,671,133 A * | 6/1987 | Yamada ................... | 192/219.5 |
| 4,722,427 A * | 2/1988 | Prumbaum et al. ...... | 192/219.5 |
| 4,727,967 A * | 3/1988 | Ogasawara et al. ...... | 192/219.5 |
| 6,290,047 B1 * | 9/2001 | Adamczyk et al. ...... | 192/219.5 |
| 2005/0205383 A1 * | 9/2005 | Reed et al. .............. | 192/219.5 |

* cited by examiner

*Primary Examiner*—Rodney H. Bonck

(57) ABSTRACT

This invention relates to an actuable park pawl system for a hybrid electro-mechanical transmission located in the end cover portion of the transmission housing. The end cover portion is configured to cover the park pawl system and ancillary components such as the actuator guide. This enables the actuator guide to be an open-ended structure. A method of securing a park engagement system with an open-ended actuator guide in a vehicle transmission is further provided.

7 Claims, 3 Drawing Sheets

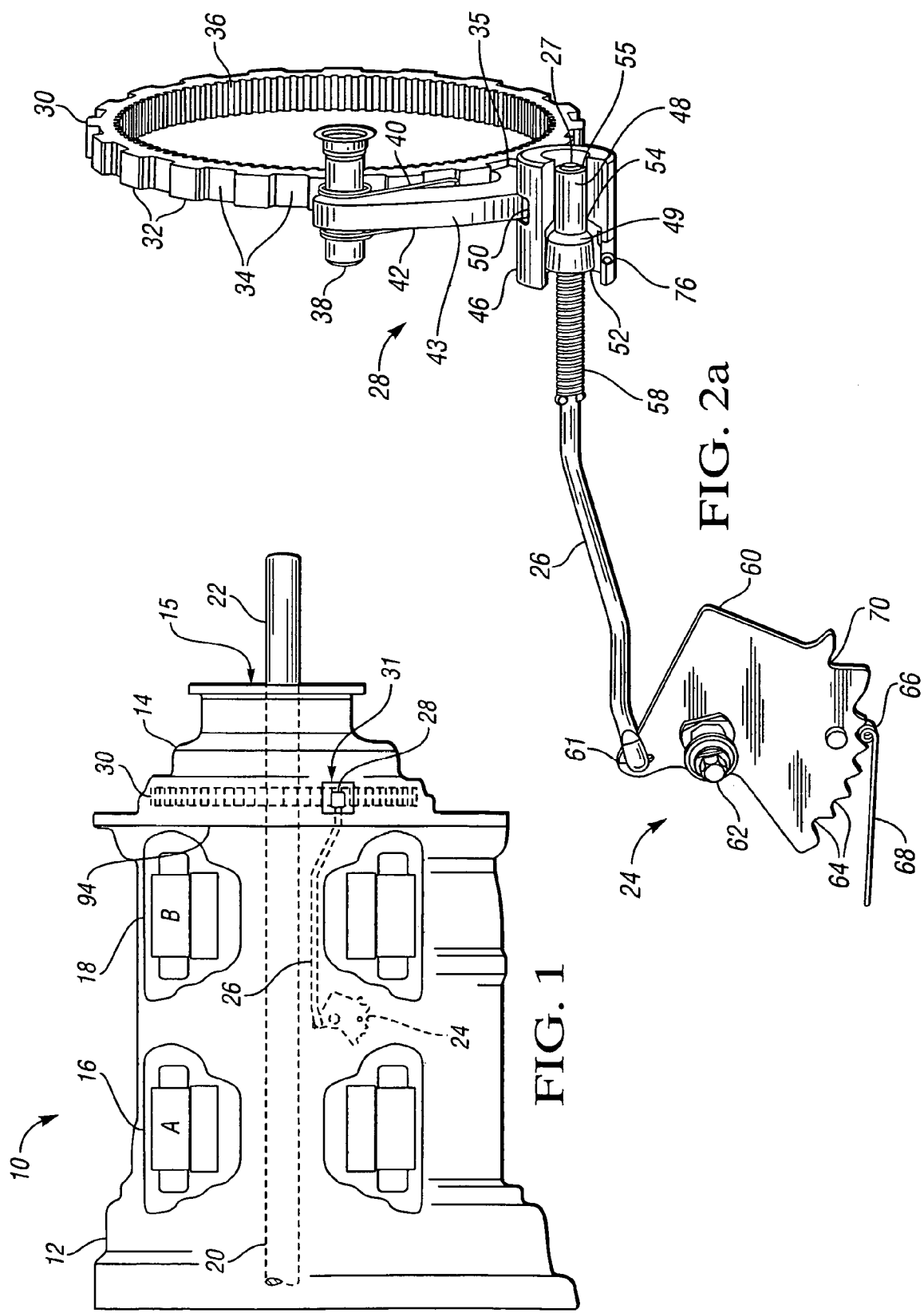

NON-SEALED PARK ACTUATOR GUIDE FOR HYBRID TRANSMISSION AND METHOD

CROSS-REFERENCE TO RELATED APPLICATIONS

This application claims the benefit of U.S. Provisional Application 60/555,141 filed Mar. 22, 2004.

TECHNICAL FIELD

This invention relates to a vehicle transmission having an actuable park pawl system with an open-ended actuator guide.

BACKGROUND OF THE INVENTION

Vehicle transmissions, specifically planetary gear automatic power transmissions, typically have a park brake mechanism to resist the vehicle's natural tendency to roll down a sloped surface when the vehicle is in park. The contents of an actuable park brake generally include some sort of actuator guide.

Vehicles with complex non-traditional powertrains, like electromechanical vehicles, still require a park brake mechanism. However, the alteration of some components in the transmission may require the park brake and its complementary components to be altered as well. For example, some hybrid electromechanical transmissions require the use of two electric motors to supply power to the output shaft of the transmission. The two motors significantly increase the amount of packaging space needed for the transmission.

SUMMARY OF THE INVENTION

With the present invention, the park brake for the electromechanical transmission is placed farther rearward, in comparison to the typical transmissions mentioned above, to accommodate the second electric motor. A cover or housing is required to protect the park brake and actuator guide from contamination, thereby eliminating the need for the actuator guide to be a self-sealed structure. Therefore, the present invention provides a transmission with actuable park pawl system which includes an actuator guide that is sufficiently open-ended to enable the connecting rod and actuator of the park pawl system to at least partially pass through the actuator guide.

In one aspect of the present invention, the park pawl system is partially covered by a detachable end cover portion of the transmission housing, which prevents the actuator guide from being externally exposed.

In another aspect of the invention, the park pawl system includes a lock pin fittable into a slot in the actuator guide to restrict the actuator guide from moving.

More specifically, the present invention relates to a transmission having an actuable park pawl system with an actuator with a cam portion, a park pawl in mechanical communication with the cam portion and rotatable when in mechanical communication with the cam portion to actuate the park pawl system and an actuator guide which accommodates the mechanical communication of the park pawl and cam portion when the park pawl system is actuated. Additionally, the transmission includes a shift selector, which actuates the park pawl system, and a connecting rod that sends a mechanical signal from the shift selector to the park pawl system. The actuator guide is sufficiently open ended to allow the connecting rod to pass through the actuator guide.

Another aspect of this invention is a method of securing a park engagement system in a vehicle transmission. The method includes: forming the transmission with a main housing portion and detachable cover portion; installing a shift selector in the main housing portion; installing an engagement gear, pawl and actuator guide in the cover portion; and guiding a connecting rod into the actuator guide.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic side elevational view of an electromechanical transmission housing with end cover portion and with parts broken away to show the electrical motors in their respective housings;

FIG. 2a is a perspective view of the park pawl system, with a partial fragmentary view of the actuator guide isolated from the main transmission housing and end cover portion;

DESCRIPTION OF THE PREFERRED EMBODIMENTS

Figure 2B:
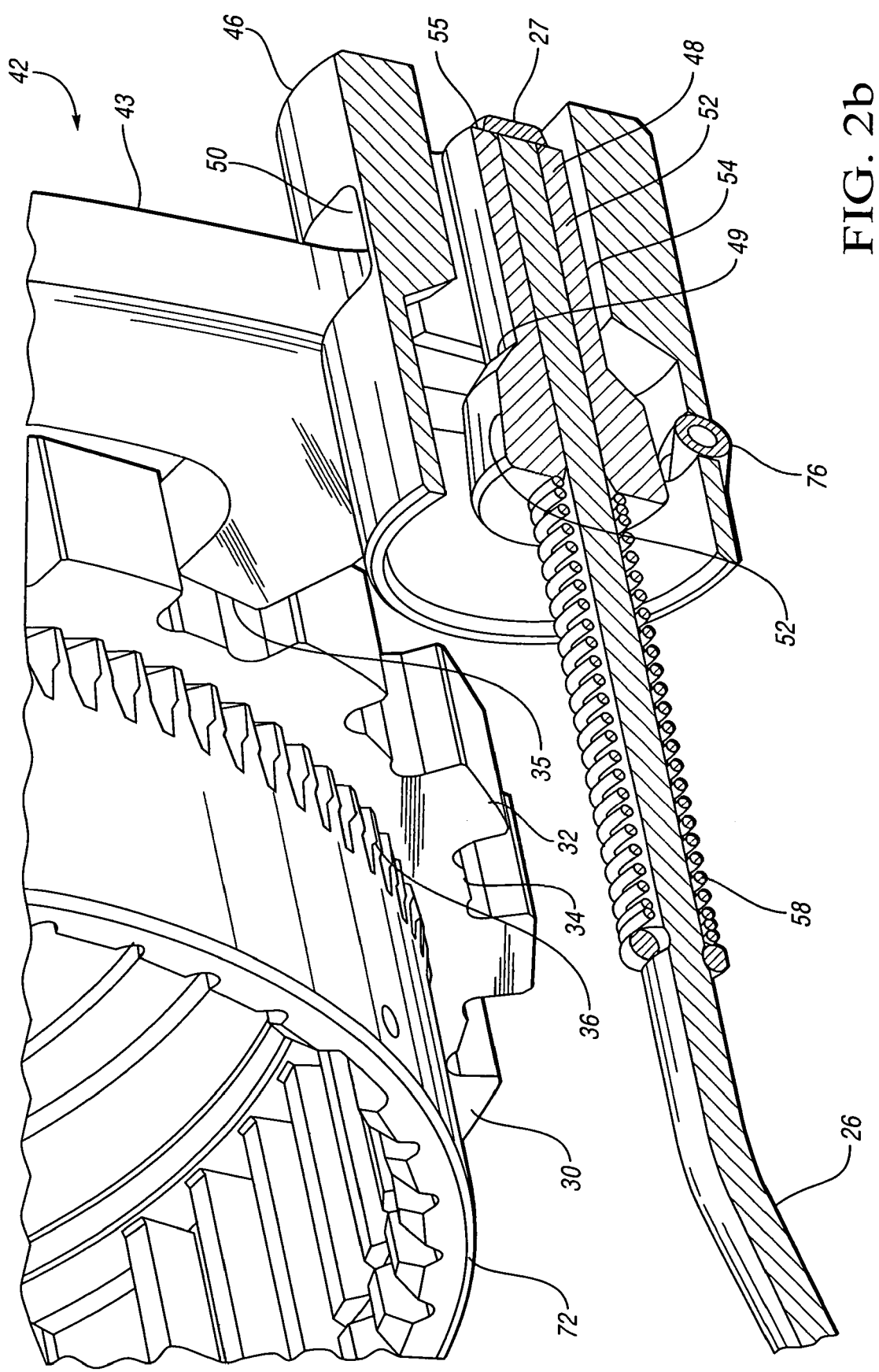
FIG. 2b is a perspective view of the park pawl system including a partial fragmentary view of the actuator guide, actuator, connecting rod and lock pin isolated from the main transmission housing and end cover portion.
Figure 3:
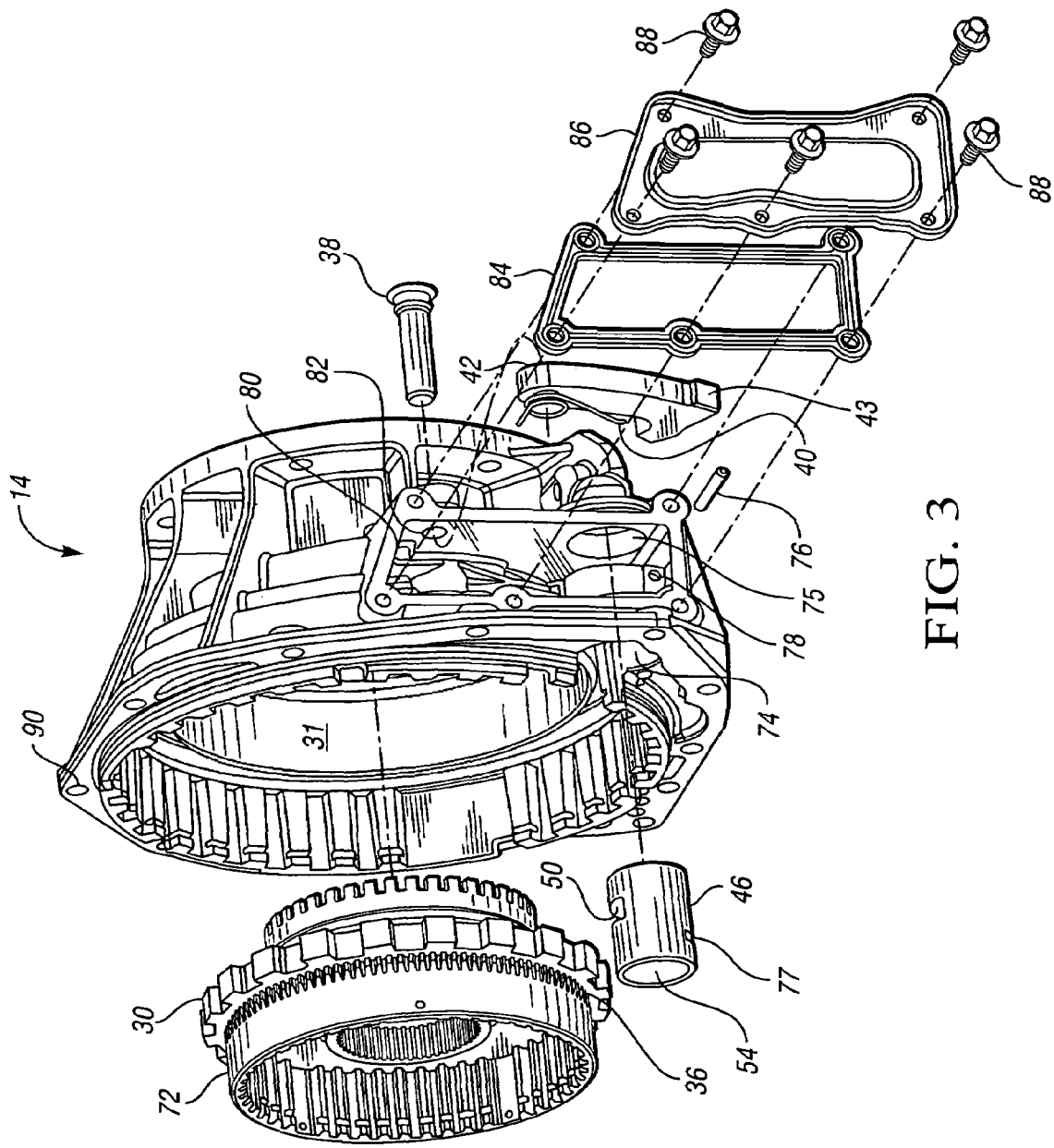
FIG. 3 is an exploded perspective view of the end cover portion, engagement gear, park pawl system, and access cover.

Referring to the drawings, FIGS. 1 through 3, wherein like characters represent the same or corresponding parts throughout the several views, there is shown in FIG. 1 a schematic side elevational view of a hybrid electromechanical transmission 10. In sum, the electromechanical transmission 10 has an actuable park pawl system 28 with an actuator 48 with cam portion 49, a park pawl 42 in mechanical communication with the cam portion 49 and rotatable when in mechanical communication with the cam portion 49 to actuate the park pawl system 28 as show in FIG. 2a. The actuator guide 46, as highlighted in FIG. 2b, accommodates the mechanical communication of the park pawl 42 and cam portion 49 when the park pawl system 28 is actuated. Also included is a shift selector 24, which actuates the park pawl system 28, and a connecting rod 26 that sends a mechanical signal from the shift selector 24 to the park pawl system 28. The actuator guide 46 is open ended to allow the connecting rod 26 to pass through the actuator guide 46. The end cover portion 14, as shown in FIG. 3, covers the park pawl 42 and its harmonizing components.

The transmission 10 consists of a two-part housing: the main housing 12 and the end cover portion 14. The main housing 12 contains two electric motors (A and B), which have their respective housings (or modules) 16 and 18. Motors A and B are journaled onto the main shaft 20 of the transmission, which is selectively linked to the output shaft 22 of the transmission. The motors (A, B) operate to selectively engage with clutches (not shown) to rotate the main shaft 20 at variable speeds and indirectly rotate the output shaft 22. The available packaging space in the main housing 12 of the transmission 10 is dominated by the drum housings (16 and 18) for the electric motors A and B, respectively (as shown in FIG. 1). One technical advantage of the present invention is that it enables the main housing 12 to accommodate both electric motors (A and B) by rearranging the position of other transmission components, namely the park pawl system 28. Located between and encircled by the pair of motors is a shift selector 24 that is connected (either mechanically or electrically) to the transmission gear shifter (not shown) and to a mechanical link (or connecting rod 26) that controls the park pawl system 28. The park pawl system 28 is encased by the end cover portion 14 of the transmission housing and functions to selectively interact with an engagement gear 30, which is secured to rotate with the output shaft 22.

FIGS. 2a and 2b detail the interaction between the engagement gear 30, park pawl system 28 and the shift selector 24. The engagement gear 30 has a number of teeth 32 and tooth recesses 34 on its perimeter. On the inner diameter of the engagement gear 30 are a series of complementary splines 36 functioning to secure the engagement gear 30 directly onto the clutch housing 72 (as shown in FIG. 3) and indirectly onto the output shaft 22 (shown in FIG. 1). When the wheels of the vehicle rotate by external forces, such as gravity, the drive shaft also turns and causes the output shaft 22 and engagement gear 30 on the clutch housing 72 to rotate as the engagement gear 30 is configured to rotate with the output shaft 22.

With reference to FIG. 2a, the park pawl system 28 consists of a pawl pin 38, torsion spring (or pawl return spring 40), pawl 42 and actuator guide 46. The pawl 42, actuator 48, and actuator guide 46 are placed in the end cover portion 14, situated to axially align the pawl 42 with the pawl engagement gear 30. The pawl 42 is configured to fit in the tooth recesses 34 on the engagement gear 30 perimeter upon activation of the park pawl system 28 (as shown at 35). The pawl 42 is mounted on the pawl pin 38, and is free to rotate or pivot about the pawl pin 38. A pawl return spring 40 operates to hold the pawl 42 in the disengaged position except when mechanically engaged. The pawl 42 is mounted adjacent to the slotted actuator guide 46 and actuator 48 so that upon transverse motion of the actuator 48 the pawl 42 is rotated or pivoted between the engaged and disengaged positions.

The actuator guide 46 encases the actuator 48 and is secured by a lock pin 76 (through pin slot 77 shown in FIG. 3) with respect to the end cover portion 14. The end cover portion 14 is hollowed at bored hole 75 to receive and accommodate the end shape of the actuator guide 46. Since the end cover portion 14 houses the end of the operating zone of the actuator within the bored hole 75 the actuator guide 46 can be an open-ended structure and remain protected from harmful contaminates. The actuator guide 46 has an internal cavity 54 (as shown in FIG. 2a) contoured to the shape of the actuator 48. The actuator guide 46 has a slot 50 on its perimeter, adjacent the back 43 of the pawl 42, which is configured to guide and support the pivotal movement of the pawl 42. Movement of the actuator 48 aft causes the cam portion 49 and wide portion 52 of the actuator to collide with the back 43 of the pawl and force the park pawl 42 to rotate or pivot into engagement with a recess 34 in the engagement gear 30 (as shown in FIG. 2a). Movement of the actuator 48 forward with respect to the pawl 42 moves the cam portion 49 away from the back 43 of the pawl 42 to remove the force of the cam, whereby to release the pawl 42 from the tooth recess 34. When the pawl 42 is released from the tooth recesses 34, the pawl return spring 40 rotates the pawl 42 into the disengaged position allowing the engagement gear 30 to freely rotate.

The actuator 48 is spring mounted to an end portion 27 of the connecting rod 26 as shown in FIG. 2b. The axially positioned linear spring (or actuator return spring 58) functions to enable shift selection of park regardless of the position of the pawl 42 relative to the engagement gear 30, teeth 32 and tooth recesses 34. If an engagement gear tooth 32 is located over or adjacent to the pawl 42 when park is selected, the pawl 42 will not engage in a recess 34, but the end 27 of the connecting rod will continue to move with respect to the actuator 48 against the bias of spring 58, and the end 27 of the connecting rod 26 will extend slightly beyond the end 55 of the actuator 48 and open-ended actuator guide 46. The actuator return spring 58 enables selection of park by maintaining an axial force or bias on the actuator 48 until the engagement gear 30 rotates to a point where the gear tooth 32 is no longer adjacent to the pawl 42. With the continued bias of actuator return spring 58, the pawl 42 will then engage with a tooth recess 34 at the first opportunity (usually when the vehicle starts or continues to roll). The end 27 of the connecting rod 26, which functions as a mechanical link between the shift selector 24 and the actuator 48, is then stationary as the actuator 48 moves under the bias of the actuator spring 58 and the pawl 42 engages the tooth recess 34. The open end 27 of the connecting rod 26, which functions as a mechanical link between the shift selector 24 and the actuator 48 then moves again with respect to the actuator 48 as the pawl 42 engages the tooth recess 34. The openness of the actuator guide 46 slightly extends the operating zone of the actuator so that the connecting rod 26 of the actuator 48 may pass through until the pawl 42 is able to engage with a tooth recess 34.

With reference to FIGS. 1 and 2a, the connecting rod 26 is secured to the detent lever 60 of the shift selector at 61. The detent lever 60 is pivotably secured with respect to the main housing 12 of the transmission at 62, where the selector shaft lever (not shown) is also connected. The perimeter of the detent lever 60 has detents 64 on its lower end. The detents 64 are configured to engage with the cylindrical end 66 of a detent retention spring 68. The detent retention spring 68 is indirectly mounted with respect to the main housing 12 of the transmission so that upon placing the vehicle in park the selector shaft lever rotates the detent lever 60 and the cylindrical end 66 of the detent retention spring 68 engages with the most aft detent 70 of the detent lever 60 to secure it in place. To reach this position the detent lever 60 rotates clockwise, or rearward with respect to the main housing 12 moving the connecting rod 26 rearward or toward the end cover portion 14 of the transmission housing 10.

The end cover portion 14 of the transmission housing, as shown in FIG. 3, is designed to encase the engagement gear 30 and park pawl system (38, 40, 42, 46 and 50). The end cover portion 14 is hollowed large enough at 31 to encase the engagement gear 30 and allow it to freely rotate. Splined to the engagement gear 30 is a clutch housing 72, which is also drivably connected to the output shaft 22 (only shown in FIG. 1) of the transmission. The end cover portion 14 contains an aperture 15 to allow for the output shaft 22 to extend out of the end cover portion 14 of the transmission housing. The end cover portion 14, as shown in FIG. 3, defines a cylindrical cavity 31 configured at one side to encircle and support the actuator guide 46 respectively at the bored hole 75 and a formed cavity portion 74. The actuator guide 46 is secured to the end cover portion 14 by a pin 76 that runs through the end cover portion 14 at 78 and actuator guide 46 at pin slot 77. The end cover portion 14 allows for the connecting rod 26 of the shift selector 24 (both shown in FIG. 2a) to pass from the main housing 12 of the transmission to the actuator 48 and actuator guide 46 in the end cover portion 14 without interference. In addition to housing the park pawl system 28 and its components, the end cover portion 14 also defines several orifices (80, 82), which provide access to the park pawl system from the outside of the transmission. The first orifice 80 defines an access opening for assembly and service of the park pawl system 28, including the actuator guide 46. Orifice 82 provides an entry point for the pawl pin 38 to be assembled to the pawl 42 on the end cover portion 14. The end cover portion 14 further contains a compression gasket 84 to seal the end cover portion 14 as well as a detachable access cover 86 to close the end cover portion 14 of the transmission. The compression gasket 84 and access cover 86 are attached to the end cover portion 14 by a series of structural connectors (or bolts) 88. The end cover portion 14 is attachable to the main housing 12 by similar structural connectors such as 88 at mating orifices such as 90.

Though the end cover portion 14 may be manufactured through a number of processes, in the preferred embodiment the end cover portion 14 is manufactured by die-casting. Generally, die-casting is compatible with the use of aluminum alloys. Additionally, die-casting generally also provides excellent dimensional accuracy and stability involving high volumes. The end cover portion 14 has a complex geometry, such as the bored hole 75 configured to blanket the actuator guide 46 as shown in FIG. 3, wherein die-casting configures contours to facilitate the park pawl system 28 and its complimentary components—shown in FIGS. 2a and 2b—while remaining compact enough to meet the aforementioned compact packaging requirements. The die (not shown) for the end cover portion 14 is designed with configurations to provide such contoured surfaces.

In sum, as shown in FIG. 1, the connecting rod 26 between the shift selector 24 and the park pawl engagement system 28 passes through cast openings 94 in the transmission housing 12 and rear cover 14. The connecting rod 26, actuator 48, and actuator return spring 58, as shown in FIGS. 2a and 2b, are assembled with the transmission main housing 12. The pawl engagement gear 30, pawl 42, pawl return spring 40, and actuator guide 46 are assembled with the end cover portion 14. The actuator 48, actuator return spring 58, and connecting rod 26 are passed thru the transmission main housing 12 and rear cover cast windows or configurations 74, as shown in FIG. 3, and guided into the actuator guide 46 during final assembly of the transmission 10.

While the best modes for carrying out the invention have been described in detail, those familiar with the art to which this invention relates will recognize various alternative designs and embodiments for practicing the invention within the scope of the appended claims.

The invention claimed is:

1. A transmission, comprising:
   an end cover portion;
   an actuable park pawl system having:
      an actuator configured with a cam portion;
      a park pawl mechanically communicable with said cam portion and rotatable when in mechanical communication with said cam portion to actuate said park pawl system;
      an actuator guide accommodating the mechanical communication of said park pawl with said cam portion when said park pawl system is actuated;
   a shift selector which is operative to actuate said park pawl system;
   a connecting rod operative to send a mechanical signal from said shift selector to said park pawl system; and
   a lock pin to restrain movement of said actuator guide;
   wherein said actuator guide is sufficiently open ended to enable said connecting rod and actuator to at least partially pass through said actuator guide; and wherein said end cover portion defines a bored hole therein which does not extend thru said end cover and is sufficiently bored to receive said actuator guide thereby preventing said actuator guide from being externally exposed.

2. The transmission of claim 1, further comprising:
   a main housing portion partially covering one portion of the actuable park pawl system.

3. The transmission of claim 1, wherein said actuator guide defines a slot sufficiently large to guide said park pawl.

4. The transmission of claim 1, wherein said actuator guide defines an internal cavity contoured to accommodate the configuration of said actuator.

5. The transmission of claim 1, wherein said actuator guide defines a pin slot configured sufficiently large to receive said lock pin.

6. A transmission, comprising:
   an actuable park pawl system having:
      an actuator configured with a cam portion;
      a park pawl mechanically communicable with said cam portion and rotatable when in mechanical communication with said cam portion to actuate said park pawl system;
      an actuator guide accommodating the mechanical communication of said park pawl with said cam portion when said park pawl system is actuated;
   a shift selector which is operative to actuate said park pawl system;
   a connecting rod operative to send a mechanical signal from said shift selector to said park pawl system; and
   a lock pin to restrain movement of said actuator guide;
   wherein said actuator guide is sufficiently open ended to enable said connecting rod and actuator to at least partially pass through said actuator guide; and further comprising:
   a main housing partially covering one portion of the actuable park pawl system; and
   an end cover portion covering another portion of said actuable park pawl system; and wherein said end cover portion defines a bored hole in said end cover portion to receive said actuator guide; and
      wherein said bored hole does not extend thru said end cover portion, thereby preventing said actuator guide from being externally exposed.

7. A method of securing a park engagement system in a vehicle transmission wherein the park engagement system includes an engagement gear, an open-ended actuator guide, actuator actuable to engage a park pawl with the engagement gear, and shift selector mechanically linked to the actuator through a connecting rod to actuate the pawl, comprising:
   forming said transmission with a main housing portion and a detachable end cover portion defining a bored hole in said detachable end cover portion which does not extend thru said detachable end cover portion;
   installing the shift selector in said main housing portion;
   installing the engagement gear, pawl and actuator guide in said detachable end cover portion with said actuator guide in said bored hole thereby preventing said actuator guide from being externally exposed;
   installing a lock pin to restrain movement of said actuator guide; and
   guiding the connecting rod into the actuator guide.

* * * * *